(12) United States Patent
Pattni

(10) Patent No.: US 10,587,822 B2
(45) Date of Patent: Mar. 10, 2020

(54) AUDIO-VIDEO DISTRIBUTION SYSTEM

(71) Applicant: HD Connectivity Ltd., Malvern (GB)

(72) Inventor: Dillan Pattni, Malvern (GB)

(73) Assignee: HD Connectivity Ltd., Malvern (GB)

( * ) Notice: Subject to any disclaimer, the term of this patent is extended or adjusted under 35 U.S.C. 154(b) by 56 days.

(21) Appl. No.: 15/847,801

(22) Filed: Dec. 19, 2017

(65) Prior Publication Data

US 2018/0176480 A1   Jun. 21, 2018

(51) Int. Cl.
*H04N 5/268*   (2006.01)
*H04N 5/44*   (2011.01)
*G08C 23/04*   (2006.01)
*H04N 21/422*   (2011.01)
*H04N 21/4227*   (2011.01)
*G08C 17/00*   (2006.01)
*H04N 21/436*   (2011.01)
*H04M 1/725*   (2006.01)

(52) U.S. Cl.
CPC ............. *H04N 5/268* (2013.01); *G08C 17/00* (2013.01); *G08C 23/04* (2013.01); *H04N 5/4403* (2013.01); *H04N 21/4222* (2013.01); *H04N 21/4227* (2013.01); *H04N 21/42219* (2013.01); *H04N 21/43615* (2013.01); *H04M 1/72533* (2013.01); *H04N 2005/4425* (2013.01); *H04N 2005/4426* (2013.01)

(58) Field of Classification Search
None
See application file for complete search history.

(56) References Cited

U.S. PATENT DOCUMENTS

| 2009/0051765 | A1* | 2/2009 | Moberly ............. G06F 19/3418 348/77 |
| 2011/0047465 | A1 | 2/2011 | Thiyagarajan et al. |
| 2012/0324515 | A1 | 12/2012 | Dashevskiy et al. |
| 2014/0064735 | A1 | 3/2014 | Thompson et al. |

OTHER PUBLICATIONS

Combined Search and Examination Report issued by the UK IPO dated Jun. 23, 2017.

* cited by examiner

*Primary Examiner* — Samira Monshi
(74) *Attorney, Agent, or Firm* — Marshall & Mehorn, LLC

(57) ABSTRACT

An audio-video distribution system includes a base station 12 having inputs and outputs for connection of audio-video sources and display screens respectively. In most embodiments, any audio-video source will be selectable for viewing on any display screen. Infra-red transmitters 14*a,b,c,d* are provided for controlling connected source devices and connected display screens. An application running on a mobile computer 16 can cause the infra-red transmitters 14*a,b,c,d* to transmit infra-red commands in response to user input. This is achieved with very low latency by loading machine code instructions into a secondary computer, and causing the second computer to execute those instructions in response to user input on the mobile computer 16. The machine code instructions can be stored on the mobile computer.

13 Claims, 3 Drawing Sheets

AUDIO-VIDEO DISTRIBUTION SYSTEM

The present invention relates to an audio-video distribution system with the facility to control devices which respond to IR remote control commands.

BACKGROUND TO THE INVENTION

For many years, infra-red remote controls have been used to control home entertainment appliances such as televisions, DVD players, satellite/cable receivers, audio systems, and so on.

More recently, the ubiquitous use of smartphones has meant that there is considerable demand for controlling these entertainment appliances using a mobile app, rather than a special-purpose remote control. Apart from reducing the number of remote control devices required, control by a mobile app allows devices to be controlled from anywhere where the smartphone is in range of a WiFi® network, whereas infra-red remote controls generally require line-of-sight communication. Control of an appliance in a different room is particularly useful in the context of video distribution systems, where the signal from (for example) a single central DVD player or satellite decoder may be selectably sent to any one of multiple connected display screens. A user watching satellite television in one room may therefore wish to control a central satellite receiver which is in another part of the building.

Some entertainment appliances are now designed to be connected to a home TCP/IP network for control with a smartphone app. However, the provision of IR receivers on this type of appliance is still ubiquitous, and there is a need for a means of controlling an IR-controlled device connected to a video distribution system, via a smartphone app.

Some systems have been made available which use a TCP/IP connected device to transmit IR commands, in response to user controls in the form of a smartphone or tablet app. However, such systems often suffer from high latency, i.e. a time delay between the user selecting a function on the smartphone and the infra-red being transmitted to the entertainment appliance. This results in a poor user experience and considerable frustration. Also, existing systems are not highly integrated into video distribution systems. It is currently possible to control a video distribution system with a smartphone app to select which sources route to which display screens, and separately to control the sources and display screens with a smartphone app which sends IR commands to the sources and display screens, but these two functions use different devices and separate communication channels.

It is an object of the invention to provide low-latency app control of an appliance having an infra-red receiver.

SUMMARY OF THE INVENTION

According to the present invention, there is provided an audio-video distribution system for sending an audio and video signal from at least one audio-video source to any of a plurality of connected display screens, the system comprising:

at least one audio-video input port for connecting an audio-video source;
a plurality of audio-video output ports for connecting display screens;
at least one infra-red transmitter for transmitting infra-red remote control commands to at least one of the audio-video source(s) or at least one of the display screens;
a first computer having a network interface for connection to a packet-switched network;
a second computer, the infra-red transmitter(s) being connected to output interface(s) of the second computer, and the first computer being in communication with the second computer to allow the first computer to load machine code programs into the second computer and to cause the execution by the second computer of said machine code programs;
storage configured to contain a plurality of the machine code programs executable by the second computer, each program when executed on the second computer causing the or a selected one of the infra-red transmitter(s) to transmit a selected infra-red remote control command; and
a mobile computer having a network interface for connection to the same packet-switched network as the first computer, the mobile computer including application software configured to transmit a selection of one of the stored machine code programs via the packet-switched network to the first computer, in response to user input, the first computer being adapted to receive the selection from the mobile computer, and to cause the execution on the second computer of the selected machine code program.

The architecture of the system according to the invention allows very low-latency control, in other words a very short time delay between the user selecting a function on the mobile computer, and an infra-red remote control signal being transmitted by the IR transmitter. This is because the amount of processing required in response to user input is minimised. It is simply a matter of choosing the correct machine code program according to user input, and causing execution of that machine code program by the second computer, which has the effect of transmitting the required IR command. Where multiple IR transmitters are connected to different output interfaces of the second computer, the machine code program selected will specify not only the IR command to be transmitted, but also which one of the plurality of IR transmitters should transmit the command.

In one embodiment, the storage containing the machine code programs may be storage of the mobile computer. In this case, the machine code program to be executed will be selected according to user input, and transmitted from the mobile computer to the first computer, over the packet switched network. The first computer will then load the program into the second computer and cause the second computer to execute the loaded program. As an alternative, the storage containing the machine code programs may be storage of the first computer. In this case, only a reference or pointer to the particular selected program needs to be transmitted from the mobile computer to the first computer. The first computer then retrieves the selected program from its storage and causes execution of the selected program on the second computer. Preferably, the storage is high-speed random access memory (primary storage) of the first computer. Preferably, on initialization/power-up of the first computer, all of the machine code programs are retrieved from secondary storage and held in RAM for high-speed selection and transfer to the second computer for execution, when selected by a user.

For each discrete control function selectable by the user in the application software on the mobile computer, there is a stored machine code program which is executed unaltered on the second processor. This results in very low-latency control from a smartphone app, practically indistinguishable from direct use of the original infra-red remote control within line-of-sight of the device being controlled.

In a simplest embodiment, the video distribution system has just one audio-video input, which is distributed to all display screens. However, most embodiments will include a plurality of audio-video sources, and will allow each of the display screens to be independently switched to a chosen source, that is, any source can be viewed on any screen. The routing of audio-visual signals from sources to display screens is in this case controlled by a series of switches, which in turn are connected to output interfaces of the second computer. User selection of which source is to be displayed on a particular screen may then be effected by sending a stored machine code program (or a pointer or reference to a stored machine code program) from the mobile computer to the first computer, for execution on the second computer, in exactly the same way as the IR transmitters connected to output interfaces of the second computer are controlled. Preferably, machine code programs may be stored which, when executed on the second computer, cause a combination of a switching operation and transmission of an IR command. For example, a function in the application software on the mobile device could allow a user to press a button to switch a particular display to a satellite receiver source and select channel 1. When this function is selected, a machine code program is retrieved from storage which, when executed on the second computer, causes the audio-video signal from a particular audio-video source port to be routed to a particular display screen, and also causes an IR transmitter associated with a satellite receiver connected to the selected source port to transmit a command causing the satellite receiver to show channel 1.

The first computer and second computer are typically integrated into a single hardware base station, which also includes the input ports and output ports, and where provided switches to control routing of audio-video signals from input ports to output ports. Typically, infra-red transmitters will be provided as external devices, connectable by plug and socket to the base station, since the infra-red transmitters need to be positioned for line-of-sight communication with controlled devices, whether they are audio-video source devices or display screens.

The output ports may be in the form of HDBaseT outputs, for connection of display screens at remote locations via relatively long lengths of CAT6 twisted-pair cable. The HDBaseT standard allows for Ethernet to be carried over the same cable as HD video and audio, and so a wireless network access point may be provided adjacent the display screen, allowing the packet-switched network to be accessed wirelessly from the area around the display screen, without having to provide separate wireless network infrastructure in a large building. The HDBaseT standard also allows control signals for an infra-red transmitter to be carried over the same cable, and so an IR transmitter, in particular one associated with a display screen, may be connected to an output port of the second computer via the same CAT6 twisted-pair cable as carries the HD video from an audio-video output port of the system to the associated display screen.

Preferably, a HDBaseT input, HDMI® output, infra-red output connection, and wireless network access point, or any combination of those, are integrated into a single hardware receiver device. Typically, one receiver device would be provided for each HDBaseT audio-video output port provided on the base station.

A hardware receiver device may integrate a wireless network access point, or alternatively the hardware receiver device may integrate an Ethernet port for connection of an external wireless network access point.

The first computer in most embodiments will be in most respects similar to a general purpose computer, running a common operating system suitable for embedded systems and adapted to run application software written in high-level languages. The second computer may be in the form of a single-chip microcontroller, and generally is not provided with an operating system as such. Rather, the second computer is designed to run discrete machine code programs which are loaded into it by the first computer, and each of which has a particular hardware effect such as causing the transmission of an infra-red command or causing a particular audio-video output port to be switched to carry the signal from a particular audio-video input port, or a combination of those things. The second computer may well have a fundamentally different architecture from the first computer, for example in some embodiments the second computer may have separate program and data memory, whereas the first computer will almost always use the same memory for storage of data and program instructions, albeit this is not essential to the invention. The mobile computer is typically a smartphone or tablet device, running a mobile operating system for example Android® or iOS®.

It is evident that the machine code programs stored on the mobile computer or the first computer will need to be selected depending on the particular devices which are connected to the particular audio-video input and output ports. To allow a wide variety of devices to be used with the system without taking up a large amount of storage space on the mobile computer or first computer, it is envisaged that the mobile computer and/or the first computer will be preconfigured by storing only programs which are needed to control the currently-connected set of audio-video devices. The configuration process may be handled by the first computer. In particular, application software running on the first computer may accept user input as to which devices are connected to which ports, or alternatively may be able to automatically detect devices in some cases. The first computer will then obtain infra-red commands relating to connected devices from a library, which will typically be a remote library accessible via the internet. The first computer will then automatically generate a machine code program for each infra red command of each connected device, and then either store the generated machine code in storage associated with the first computer, and transmit references to the mobile computer for storage on the mobile computer, or directly send the generated machine code programs to the mobile computer for storage.

Typically, multiple mobile computers may be connected to a single system, for example one smartphone belonging to each member of a family. Each mobile computer can be provided with the same set of machine code programs or references for storage, and transmission to the base station in response to a user command.

At the same time, other configuration information for the application software running on the mobile computer can be distributed. For example, the layout of buttons on the screen which when pressed cause transmission of associated infra-red commands (by sending a machine code program for execution on the second computer).

Preferably, the transmission of either machine code programs or references to machine code programs from the mobile computer to the first computer is via an HTTP API. In many embodiments, machine code programs may be transmitted over HTTP or another protocol in the form of hexadecimal strings.

DESCRIPTION OF THE DRAWINGS

For a better understanding of the invention, and to show more clearly how it may be carried into effect, a specific embodiment will now be described with reference to the accompanying drawings, in which.

DESCRIPTION OF AN EXAMPLE EMBODIMENT

Figure 1:
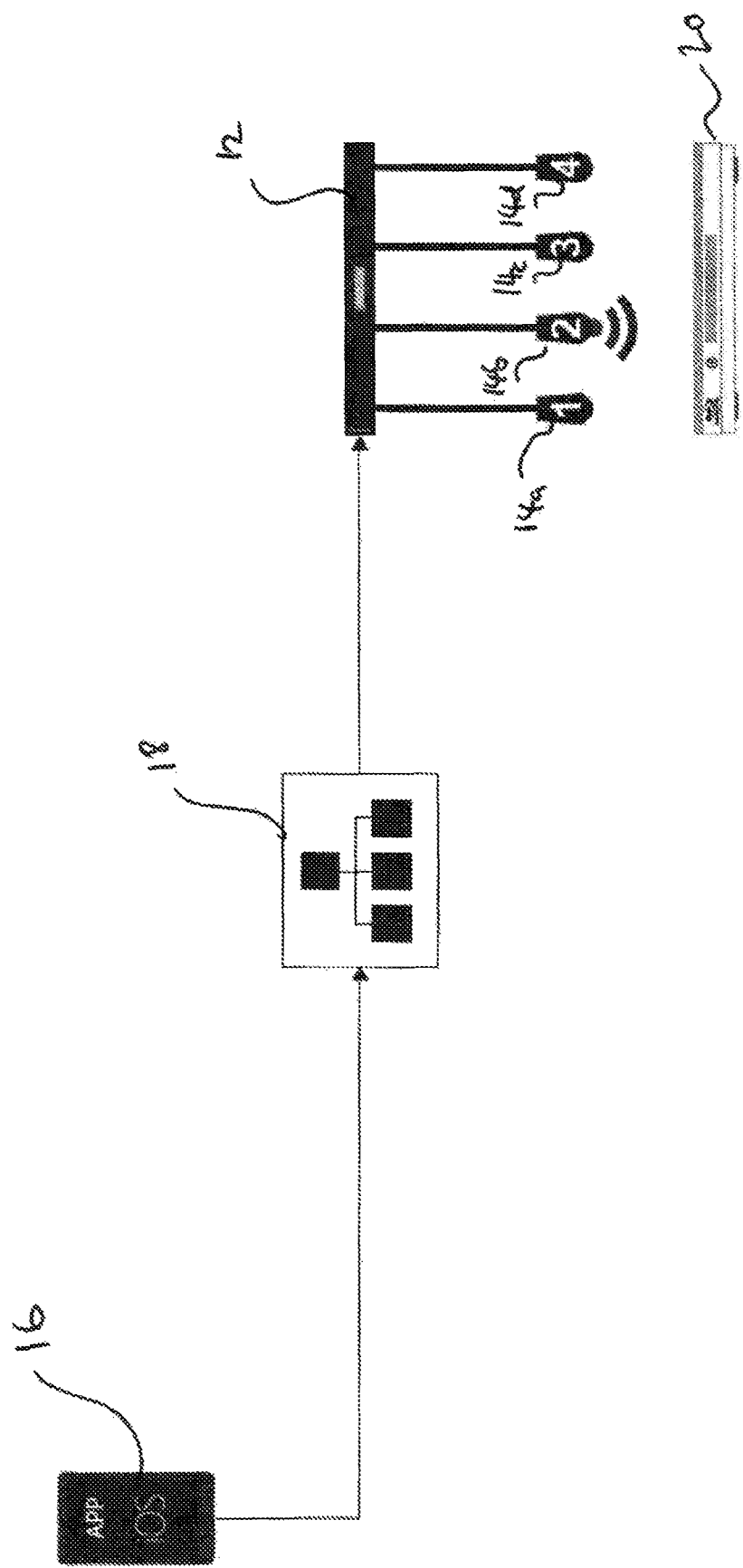
FIG. 1 is a schematic of an embodiment of the system of the invention.

Referring firstly to FIG. 1, an audio-video distribution system comprises a base station 12, a plurality of infra-red transmitters 14a,b,c,d, and a mobile device 16. The mobile device is connected to the base station via a packet-switched network 18.

The base station 12 includes a first computer and a second computer. The first computer includes a network interface and is connected to the packet-switched network 18. The first computer runs a conventional operating system for embedded systems, and runs a web server for managing and configuring the base station, among other things. The second computer is a single-chip microcontroller. The purpose of the second computer is to directly control hardware, including the infra-red transmitters 14a,b,c,d. The first computer is in communication with the first computer such that the first computer can load machine code programs into the second computer, and can cause the second computer to execute those programs.

The mobile computer 16 is a conventional mobile "smartphone", for example an iPhone® or Android® device.

The packet-switched network is typically an internal home TCP/IP network, which includes wired and wireless physical parts. In most embodiments, the mobile device 16 will connect wirelessly to the network 18, but the base station 12 may be provided with a wired network connection. In practical terms, it may be convenient to co-locate the base station 12 with home networking equipment, for example a modem-router.

For clarity, FIG. 1 does not show any display screens or audio-video input/output ports. However, these would be provided on the base station. Ideally, a video distribution system will provide multiple audio-video source inputs and multiple audio-video display outputs, with the ability to view any source on any screen. The audio-video inputs and outputs are therefore connected to each other via a switching matrix, which in turn is controlled by the second computer. A typical system might include for example four audio-video inputs (e.g. for a satellite receiver, blu-ray player, CCTV device and home computer) and four audio-video outputs (e.g. for display screens in the living room, two bedrooms and a kitchen). Ideally, infra-red transmitters are provided for each input and each output, so that both sources and display screens are controllable via the system.

In FIG. 1, a single blu-ray player 20 is shown as an example source device. Typically, source devices would be located close to the base station 12 and connected to input ports on the base station 12 via HDMI® ports. Display screens are likely to be more widely distributed, and some display screens may well be located at some distance from the base station 12. Therefore, the video signal may be transmitted from the base station to the display screen via HDBaseT over, for example, CAT6 cable. In this case, a small receiver unit will be provided near each display screen.

In this embodiment, the mobile device 16 has been configured with application software for controlling, among other devices, the blu-ray player 20. Specifically, the application software is configured to store machine code programs corresponding to remote control functions of the Blu-ray® player 20. For example, a machine code program would be provided for the play function, another program for the fast forward function, another for rewind and so on. The application software on the mobile device 16 presents the user with simple buttons to activate each function, similar to the infra-red remote control originally supplied with the Blu-ray® player 20. Each button on the user interface is associated with one of the stored machine code programs, in the sense that when the button is pressed the associated machine code program is received from storage and sent to the first computer of the base station 12 via the packet-switched network 18. The first computer then loads the machine code program into the second computer, and causes the second computer to execute that program. This has the effect of causing the infra-red transmitter 14b which is associated with the Blu-ray® player 20 to transmit the infra-red control command to the Blu-ray® player 20.

Figure 2:
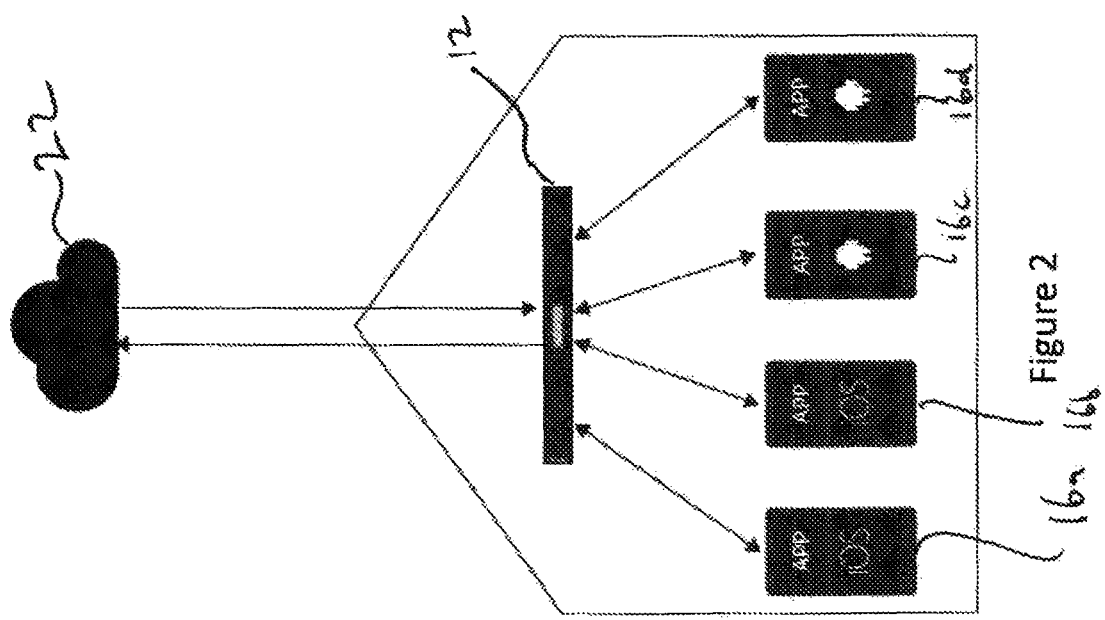
FIG. 2 illustrates a method of configuring the system of FIG. 1.

Referring now to FIG. 2, a method of configuring the system of FIG. 1 will be described. The configuration is handled primarily by the base station 12, specifically the first computer, although may be controlled by a remote user interface, for example a web-based interface or by application software running on one of the mobile devices 16a,b,c,d and communicating with the base station via a packet-switched network.

The method firstly involves establishing which devices are connected to which audio-video input ports and audio-video output ports. More precisely, it involves establishing which device is associated with each infra-red transmitter, although in this embodiment and in most embodiments each infra-red transmitter has a fixed association with an audio-video input port or an audio-video output port. Establishing which devices are connected may be a simple case of asking the user via a user interface, or it may be possible in some embodiments to automatically detect which devices are plugged into which audio-video input/output ports (and therefore which devices are associated with which infra-red transmitters). Typically, the manufacturer and model of each device is the required information, since this is what determines the infra-red commands which will control the device.

The first computer of the base station 12 will then contact a remote control command library 22. The remote control command library 22 is typically on a remote server on the internet. In FIG. 2, all of the devices shown are connected via a packet-switched network. However, the house-shaped boundary shows the extent of the home network, the remote control command library 22 is a "cloud service" on the wider internet. There is an authentication step for the base station 12 to gain access to the remote control command library. After authentication, the base station 12 can retrieve details of the remote control commands for each device which is connected to the system.

Machine code programs suitable for execution on the second computer are then generated on the first computer. A machine code program needs to be generated for each function of each device which is to be controlled. The machine code program needs to be generated to take account of not only the specific function of the specific device (and therefore the specific infra-red command which needs to be sent) but also the port which that device is plugged in to, and therefore the infra-red transmitter associated with the device. The generated machine code program, when executed on the second computer, will cause a specific infra-red command to be output by a specific infra-red transmitter.

In this embodiment, the machine code programs are sent to individual mobile devices 16a,b,c,d for storage on the mobile devices. Once the base station has been configured with details of the devices plugged in to each port and has retrieved the necessary details from the remote control command library 22, any number of mobile devices 16 can connect to the base station and synchronize their configuration with that stored on the base station. The authentication step with the remote control command library 22 does not need to be repeated, unless new devices are plugged in which require the retrieval of new remote control commands.

Figure 3:
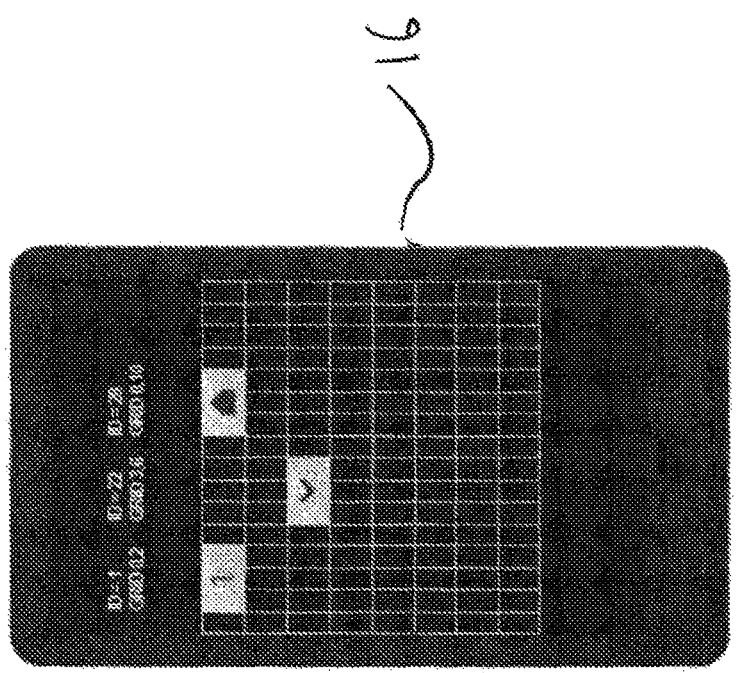
FIG. 3 illustrates another aspect of configuring the system of FIG. 1.

FIG. 3 shows another aspect of configuration of mobile devices 16, and also illustrates the user interface which is presented to a user of the system. For each device which can be controlled, each remote control function has a button provided within the application software on the mobile computer 16. Each remote control function is associated with a machine code program as described above. Additionally, the configuration can determine the layout of the buttons on the screen, for example to replicate the original infra-red remote control supplied with each device. Preferably, such screen layout information is downloaded by the base station from the remote control command library 22, at the same time as the remote control command information is downloaded. Screen layout configuration could alternatively be user-configurable, but the base station 12 can still serve to act as a central synchronization point so that each mobile computer 16 does not need to be configured separately. Preferably, configuration information for the location of each button on the screen is given in the form of grid co-ordinates, so that each button is positioned in a defined location on a grid (which is visible in FIG. 3 but in most embodiments the grid would not be visible to the user), depending on the configuration.

The video distribution system according to the invention allows very low latency control of both the video distribution system itself (i.e. control of the switching matrix— which source is displayed on which screen) and also the connected source devices and display screens, via the infra-red transmitters. Storing machine code programs for retrieval and execution on the second computer in response to user input ensures that the response speed of connected devices to the smartphone app control is comparable to the response speed when using a conventional infra-red remote control.

The invention according to the claims is not limited to the description given above, but changes and modifications will be apparent to the skilled person, including different combinations of the described features.

The invention claimed is:

1. An audio-video distribution system for sending an audio-video signal from at least one audio-video source to any of a plurality of connected display screens, the system comprising:
    a plurality of audio-video input ports for connecting an audio-video source;
    a plurality of audio-video output ports for connecting display screens;
    at least one infra-red transmitter for transmitting infra-red remote control commands to at least one of the audio-video source(s) or at least one of the display screens;
    a first computer having a network interface for connection to a packet-switched network;
    a second computer, the infra-red transmitter(s) being connected to output interface(s) of the second computer, and the first computer being in communication with the second computer to allow the first computer to load machine code programs into the second computer and to cause the execution by the second computer of said machine code programs;
    storage configured to contain a plurality of the machine code programs executable by the second computer, each program when executed on the second computer causing the or a selected one of the infra-red transmitter(s) to transmit a selected infra-red remote control command; and
    a mobile computer having a network interface for connection to the same packet-switched network as the first computer, the mobile computer including application software configured to transmit a selection of one of the stored machine code programs via the packet-switched network to the first computer, in response to user input;
    a switching matrix for routing audio-visual signals from audio-video inputs to audio-visual outputs, the switching matrix being connected to an output interface of and controllable by the second computer;
    the first computer being adapted to receive the selection from the mobile computer, and to cause the execution on the second computer of the selected machine code program.

2. An audio-video distribution system according to claim 1, in which the storage containing the machine code programs is storage of the mobile computer.

3. An audio-video distribution system according to claim 1, in which the storage containing the machine code programs is storage of the first computer.

4. An audio-video distribution system according to claim 1, in which at least one machine code program is stored which, when executed on the second processor, causes a combination of a switching operation of the switching matrix and also transmission of an infra-red remote control command by one of the infra-red transmitters.

5. An audio-video distribution system according to claim 1, in which the first computer, second computer and audio-video input and output ports are integrated into a single hardware base station.

6. An audio-video distribution system as claimed in claim 1, in which at least one of the audio-video output ports is in the form of a HDBaseT output port for connection of a remote display screen.

7. An audio-video distribution system as claimed in claim 6, in which a HDBaseT audio-video receiver is provided for deployment proximal to the remote display screen.

8. A method of configuring an audio-video distribution system according to claim 1, comprising the steps of:
    identifying the device(s) connected to the audio-video input and/or output ports, by means of application software running on the first computer;
    obtaining from a remote control command library and storing on the first computer, definitions of infra-red remote commands relating to the identified device(s);
    generating, on the first computer, a machine code program for each obtained definition of each identified device, the machine code program when executed on the second computer causing transmission of a respective infra-red remote command on an infra-red transmitter associated with the audio-video input or output port to which the respective identified device is connected;

storing each generated machine code program.

9. An audio-video distribution system according to claim 3, in which the storage is high-speed random access memory.

10. An audio-video distribution system as claimed in claim 5, in which the base station further integrates the switching matrix.

11. An audio-video distribution system as claimed in claim 7, in which the first computer, second computer and audio-video input and output ports are integrated into a single hardware base station, and in which a wireless network access point is provided in the same unit as the HDBaseT receiver, the wireless network access point being connected to the base station via the same cable which carries the HDBaseT signal, and the wireless network access point being connected to the same packet-switched network as the network interface of the first computer via that cable.

12. A method as claimed in claim 8, in which each generated machine code program is stored on the first computer, and a reference to each program is transmitted to the mobile computer(s) and stored on the mobile computer(s).

13. A method as claimed in claim 8, in which each generated machine code program is transmitted to the mobile computer(s), for storage on the mobile computer(s).

* * * * *